United States Patent
Ren et al.

(10) Patent No.: US 12,032,430 B1
(45) Date of Patent: Jul. 9, 2024

(54) CONDITION-BASED MAINTENANCE TECHNIQUES

(71) Applicant: Analog Devices International Unlimited Company, Limerick (IE)

(72) Inventors: Naiqian Ren, Limerick (IE); Claire Croke, Aherla (IE)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/176,243

(22) Filed: Feb. 28, 2023

(51) Int. Cl.
    *G06F 11/00* (2006.01)
    *G06F 11/30* (2006.01)

(52) U.S. Cl.
    CPC ........ *G06F 11/008* (2013.01); *G06F 11/3003* (2013.01)

(58) Field of Classification Search
    CPC ............................ G06F 11/008; G06F 11/3003
    See application file for complete search history.

(56) References Cited

U.S. PATENT DOCUMENTS

| | | |
|---|---|---|
| 8,103,463 B2 | 1/2012 | Kalgren et al. |
| 9,703,902 B2 | 7/2017 | Asenjo et al. |
| 9,729,639 B2 | 8/2017 | Sustaeta et al. |
| 10,782,680 B2 | 9/2020 | Chapin et al. |
| 11,243,505 B2 | 2/2022 | Strohmenger et al. |
| 11,347,191 B2 | 5/2022 | Hsu |
| 2017/0242950 A1 | 8/2017 | Cockrell et al. |
| 2019/0087256 A1* | 3/2019 | Horrell ............... G01M 99/005 |
| 2019/0354914 A1* | 11/2019 | Nicholas ............ H04L 63/1425 |
| 2020/0051419 A1 | 2/2020 | Malaver et al. |
| 2020/0192338 A1 | 6/2020 | Mangino |

FOREIGN PATENT DOCUMENTS

BR       102016023297 A2     5/2018

OTHER PUBLICATIONS

"Condition Monitoring and Industrial IoT: Predictive maintenance, fault detection, industry 4.0", STMicroelectronics, [Online] Retrieved from the Internet: <URL: https://www.st.com/en/partner-products-and-services/condition-monitoring-and-industrial-iot.html#overview>, (Retrieved on Aug. 31, 2022), 1 pg.

* cited by examiner

*Primary Examiner* — Nadeem Iqbal
(74) *Attorney, Agent, or Firm* — Schwegman Lundberg & Woessner, P.A.

(57) ABSTRACT

Systems and methods that combine multiple techniques such as supervised learning, data analytics, measurement hardware modelling and scalable sensing hardware to quickly deliver a highly optimized and production ready solution to cover the condition-based maintenance requirements of a specific physical asset.

20 Claims, 9 Drawing Sheets

CONDITION-BASED MAINTENANCE TECHNIQUES

FIELD OF THE DISCLOSURE

This document pertains generally, but not by way of limitation, to machine condition monitoring.

BACKGROUND

Manufacturing and processing facilities and plants usually contain many physical assets, such as including machines, for various applications. Machines, for example, generally have complex mechanical components of all sizes and shapes. In some facilities, hundreds or even thousands of machines may exist in connection with various processes being performed to meet the manufacturing and processing requirements.

Many machines, such as compressors, turbines, pumps, motors, and fans, include rotational components. In order to maintain, troubleshoot and operate these machines, it is often important to monitor the machines during operation and detect any potential component defects or operational faults. Rotation speed, or rotations per minute (RPM) readings, can be used to assess operations of some rotational components of a machine. Some problems with the machines that are not readily apparent to the naked eyes or are otherwise difficult or impossible to ascertain can be identified by analyzing the RPM readings. For example, significant deviations of RPM readings from some specified machine specification, or away from past RPM readings, can be indicative of machine anomaly that requires maintenance, repair, or replacement of a machine part.

Accurate characterization of a health condition of a machine or a machine part is important for detecting a machine fault and generating fault diagnostics. Improper or inaccurate characterization (e.g., RPM readings) can lead to false detection or misdiagnosis of a fault. Conventional machine fault detection generally requires a human operator to perform machine fault testing intermittently, such as during scheduled maintenance. The engineer may use a portable instrument to perform an RPM test, interpret the results, and decide presence or absence of machine faults, and recognizes particular fault types.

SUMMARY OF THE DISCLOSURE

The present inventors have recognized a need for a highly efficient process of developing asset specific sensing solutions for CBM applications. This disclosure describes a method that combines multiple techniques such as supervised learning, data analytics, measurement hardware modelling and scalable sensing hardware to quickly deliver a highly optimized and production ready solution to cover the CBM requirements of a specific physical asset.

In some aspects, this disclosure is directed to a computer-implemented method of determining a condition-based maintenance hardware solution for monitoring a physical asset, the computer-implemented method comprising: receiving, from a plurality of different sensor types, data representing corresponding sensed physical properties of a training asset; receiving, from a first party, training asset failure information; receiving information that represents a hardware model of at least the plurality of different sensor types; and in response to 1) the data representing corresponding sensed physical properties of the training asset, 2) the training asset failure information, and 3) the information that represents the hardware model of at least the plurality of different sensor types: 1) generating and displaying an output that represents a first hardware configuration for monitoring the physical asset, or 2) selecting a second hardware configuration from a set of pre-defined hardware configurations, wherein the first hardware configuration and the second hardware configuration include at least one of the plurality of different sensor types.

In some aspects, this disclosure is directed to a system for determining a condition-based maintenance hardware solution for monitoring a physical asset, the computer-implemented method comprising: a computing device having a processor configured to: receive, from a plurality of different sensor types, data representing corresponding sensed physical properties of a training asset; receive, from a first party, training asset failure information; receive information that represents a hardware model of at least the plurality of different sensor types; in response to 1) the data representing corresponding sensed physical properties of the training asset, 2) the training asset failure information, and 3) the information that represents the hardware model of at least the plurality of different sensor types: 1) generate and display an output that represents a first hardware configuration for monitoring the physical asset, 2) select a second hardware configuration from a set of pre-defined hardware configurations, or 3) configure, using software, a third hardware configuration; wherein the first hardware configuration and the second hardware configuration include at least one of the plurality of different sensor types; and use a trained machine learning model with the first hardware configuration or the second hardware configuration to automatically predict a failure of a component of the physical asset.

In some aspects, this disclosure is directed to a computer-implemented method of determining a condition-based maintenance hardware solution for monitoring a physical asset, the computer-implemented method comprising: receiving, from a plurality of different sensor types, data representing corresponding sensed physical properties of a training asset; receiving, from a first party, training asset failure information; receiving information that represents a hardware model of at least the plurality of different sensor types; in response to 1) the data representing corresponding sensed physical properties of the training asset, 2) the training asset failure information, and 3) the information that represents the hardware model of at least the plurality of different sensor types: 1) selecting a first hardware configuration from a set of pre-defined hardware configurations, or 2) configure, using software, a second hardware configuration; wherein the first hardware configuration includes at least one of the plurality of different sensor types; and using a trained machine learning model with the first hardware configuration or the second hardware configuration to automatically predict a failure of a component of the physical asset.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Conventional machine health monitoring and maintenance, such as corrective or reactive maintenance, can have severe performance cost. For example, preventive or scheduled maintenance replaces machine parts before the end of their useful life, thereby increasing the operating cost to the facility. In contrast, condition-based maintenance (CBM) services actively manage the health condition of the physical assets, such as machines, being monitored in order to perform maintenance only when it is needed and at the most opportune times. CBM optimizes the tradeoff between maintenance costs and performance costs by increasing availability and reliability while eliminating unnecessary maintenance activities. As a result, increased safety of physical assets and system reliability and availability, and reduced maintenance cost and inventories can be achieved.

An important aspect of a CBM system is the long-term cost savings achieved through predicting a fault in a physical asset, e.g., critical assets, before the fault reaches a functional failure. One CBM approach is to use a measurement system with multiple sensing modalities to monitor the physical asset. The CBM system analyzes sensed signal patterns and tries to detect anomalies, which can be used for fault prediction.

The present inventors have recognized that currently there is no approach to assist a designer in determining the details of the capability of the CBM measurement system. For example, CBM system requirements can vary depending on the physical asset being monitored. Current CBM measurement systems can use expensive high performance measurement instruments that are too expensive to scale for mass production or use low-cost low performance measurement instruments that cannot accurately and adequately detect and predict certain failures. Currently, there is no approach that assists in matching the capability and performance characteristics of the CBM measurement system with the CBM requirements of the physical asset.

Furthermore, most CBM algorithms are developed using a specific measurement hardware for use with specific physical asset being monitored, which requires that the CBM measurement solution to be capable of collect and transmit a large amount of training data for machine learning. Such a requirement drives higher measurement solution cost, making it difficult to scale to monitor assets in high volume production.

The present inventors have recognized a need for a highly efficient process of developing asset specific sensing solutions for CBM applications. This disclosure describes a method that combines multiple techniques such as supervised learning, data analytics, measurement hardware modelling and scalable sensing hardware to quickly deliver a highly optimized and production ready solution to cover the CBM requirements of a specific physical asset.

Figure 1:
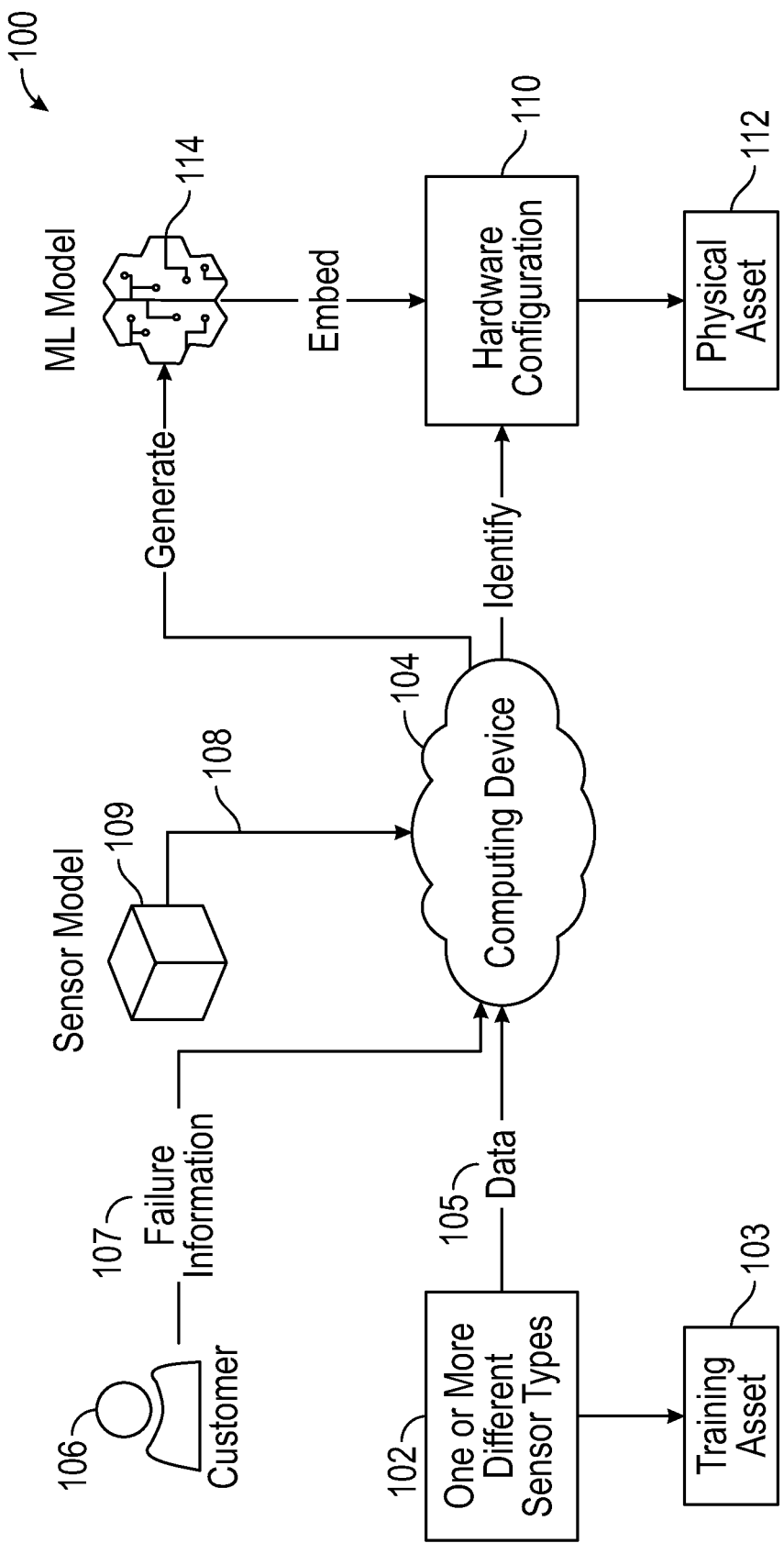
FIG. 1 is a diagram showing one example of a system for determining a condition-based maintenance hardware solution for monitoring a physical asset, in accordance with this disclosure.

FIG. 1 is a diagram showing one example of a system for determining a condition-based maintenance hardware solution for monitoring a physical asset, in accordance with this disclosure. The physical asset includes, but is not limited to, machinery, such a production machinery, as well as trains, airplanes, automobiles and other vehicles, wind turbines, and electric utility transformers. The system 100 includes one or more different sensor types 102. For example, the one or more different sensor types 102 can include, but are not limited to, vibration sensors, temperature sensors, pressure sensors, torque sensors, speed sensors, magnetic field sensors, humidity sensors, and acoustic sensors. Together, the one or more different sensor types 102 can represent a high performance, multi-modality sensing solution that can be used for data mining.

In some examples, the one or more different sensor types 102 of the solution can include multiple ones of the same sensor type. As a non-limiting example for the purposes of explanation only, the one or more different sensor types 102 can include three vibration sensors, four temperature sensors, one acoustic sensor, one humidity sensor, and one magnetic field sensor.

The one or more different sensor types 102 (together with a high-performance data acquisition system) can represent a high-performance, multi-modality sensing solution for data mining. The one or more different sensor types 102 can monitor a training asset, which can be the actual physical asset that will later be the subject of the CBM service or a physical asset that is similar to the actual physical asset. The one or more different sensor types 102 generate data 105, e.g., raw data, representing corresponding sensed physical properties of the training asset 103. For example, the one or more different sensor types 102 can monitor a motor to detect particular failures, such as bearing failures or gear box failures. By way of a non-limiting example, the data gathered from some sensor types may help detect a bearing failure three weeks in advance of a catastrophic failure whereas other sensor types may be used to detect a gear box failure two weeks in advance.

The one or more different sensor types 102 can stream the data 105 representing corresponding sensed physical properties of the training asset 103 to a computing device 104. The computing device 104 can be a single computing device or multiple computing devices. The multiple computing devices can be co-located or in different locations. In some examples, the computing device 104 can be a server, e.g., a cloud server. The computing device 104 can implement the techniques of this disclosure to determine a condition-based maintenance hardware solution for monitoring a physical asset.

A first party, such as a customer 106, can provide training asset failure information 107 to the computing device 104. For example, the training asset failure information can include failure log information that represents fault and/or failure information of the training asset 103.

In addition, the computing device 104 can receive information 108 that represents a model 109, e.g., digital model, of the one or more different sensor types and the data acquisition hardware 102 as well as sensors and data acquisition hardware available for a final hardware configuration 110. For example, the information 108 can be sensor modelling information of the one or more different sensor types and the data acquisition hardware 102. In some examples, the information 108 can be a hardware model that represents the group of one or more different sensor types 102. In other examples, the information 108 can be a hardware model that represents individual ones of the one or more different sensor types 102.

In this manner, the computing device 104 can receive: 1) the data representing corresponding sensed physical properties of the training asset (from the one or more different sensor types 102); 2) the training asset failure information (from the customer 106); and 3) the information 108 that represents a hardware model of the plurality of different sensor types and the data acquisition hardware. In response, the computing device 104 can 1) generate and display an output that represents a first hardware configuration for monitoring the physical asset, or 2) select a second hardware configuration from a set of pre-defined, e.g., optimized, hardware configurations, where the first hardware configuration and the second hardware configuration include at least one of the one or more different sensor types 102. For example, the computing device 104 can select the second hardware configuration from a set of ten hardware configurations, at least some of which having some configurability.

In some examples, the computing device 104 can generate and display a specific recommended hardware configuration. In other examples, the computing device 104 can select from a set of available hardware configurations, such as by performing data analytics on the data collected using a hardware model of pre-existing scalable hardware configurations to identify the most suitable hardware solution. In either case, the computing device 104 can recommend a hardware configuration 110 for a CBM measurement system for monitoring a physical asset 112.

Some of the one or more different sensor types 102 can include a precision that may be higher than what will actually be needed later to monitor the physical asset 112. Precision is one of the parameters can be changed. Others include, but are not limited to, sample rate, number of samples collected within a given period, sampled signal bandwidth, and digital signal processing techniques.

The computing device 104 can use the sensor or hardware model 109 and manipulate the data 105 based on sensor and data acquisition hardware modelling information of pre-existing hardware sensors or sensor configurations with lower precision to determine if the fault or failure can still be detected. As a non-limiting example, the computing device 104 may determine that a magnetic field sensor is not needed but that temperature data is critical and, as such, one or more temperature sensors are needed. By way of another non-limiting example, if the one or more different sensor types 102 includes a 24-bit precision temperature sensor, and if temperature causes a failure of the physical asset 112, the computing device 104 can determine if a 12-bit precision temperature sensor can be used instead of a more expensive 24-bit temperature and still detect the failure. In this manner, the techniques of this disclosure can be used to determine which signals are the critical signals, how often those signals need to be measured, and to what accuracy do those signals need to be measured.

By using the techniques of this disclosure, the computing device 104 can determine, for example, the type(s) of sensors needed, how many of each type are needed, and/or a precision for each type of sensor in order to successfully predict a fault or failure of physical asset 112. In this manner, the computing device 104 can provide an asset specific hardware sensing solution for CBM applications. The customer 106 can then deploy the asset specific hardware configuration 110 to perform CBM on the physical asset 112 with the assurance that the capability and performance characteristics of the CBM measurement system matches the CBM requirements of the physical asset.

After the computing device 104 has recommended the hardware configuration 110, the computing device 104 can train a machine learning (ML) model 114, such as with supervised learning, to automatically predict a failure of a component of the physical asset. In this manner, the system 100 can use a trained machine learning model with the hardware configuration 110 to automatically predict a failure of a component of the physical asset 112.

The computing device 104 can use the sensor or hardware model 109 and use machine learning and manipulate the data 105 based on sensor modelling information of pre-existing hardware sensors or sensor configurations to determine if the fault or failure can be detected. The computing device 104 can manipulate the data 105, such as by adding noise, adding distortion, adding error, reduce the sample rate, reduce signal bandwidth, emulating duty cycled sampling operation and emulating multiplexed sequential sampling operation, to determine which data 105 is required to train the machine learning model 114 to automatically predict a failure of a component of the physical asset.

For example, some data 105 may be redundant and other data 105 may not be necessary at all. As a non-limiting example, the computing device 104 may determine that a magnetic field sensor is not needed but that temperature data is critical and, as such, one or more temperature sensors are needed. Thus, the computing device 104 can determine that the magnetic field data is not necessary, and that temperature data is critical. In this manner, the computing device 104 can train the machine learning model 114 using the data 105 determined to be critical for fault or failure detection. Then, the machine learning model 114 can be embedded into the hardware configuration 110 and used for a CBM application to automatically predict a failure of a component of the physical asset. In this example, hardware configuration 110 is hardware that has a temperature sensing capability an no magnetic field sensing support.

Figure 2:
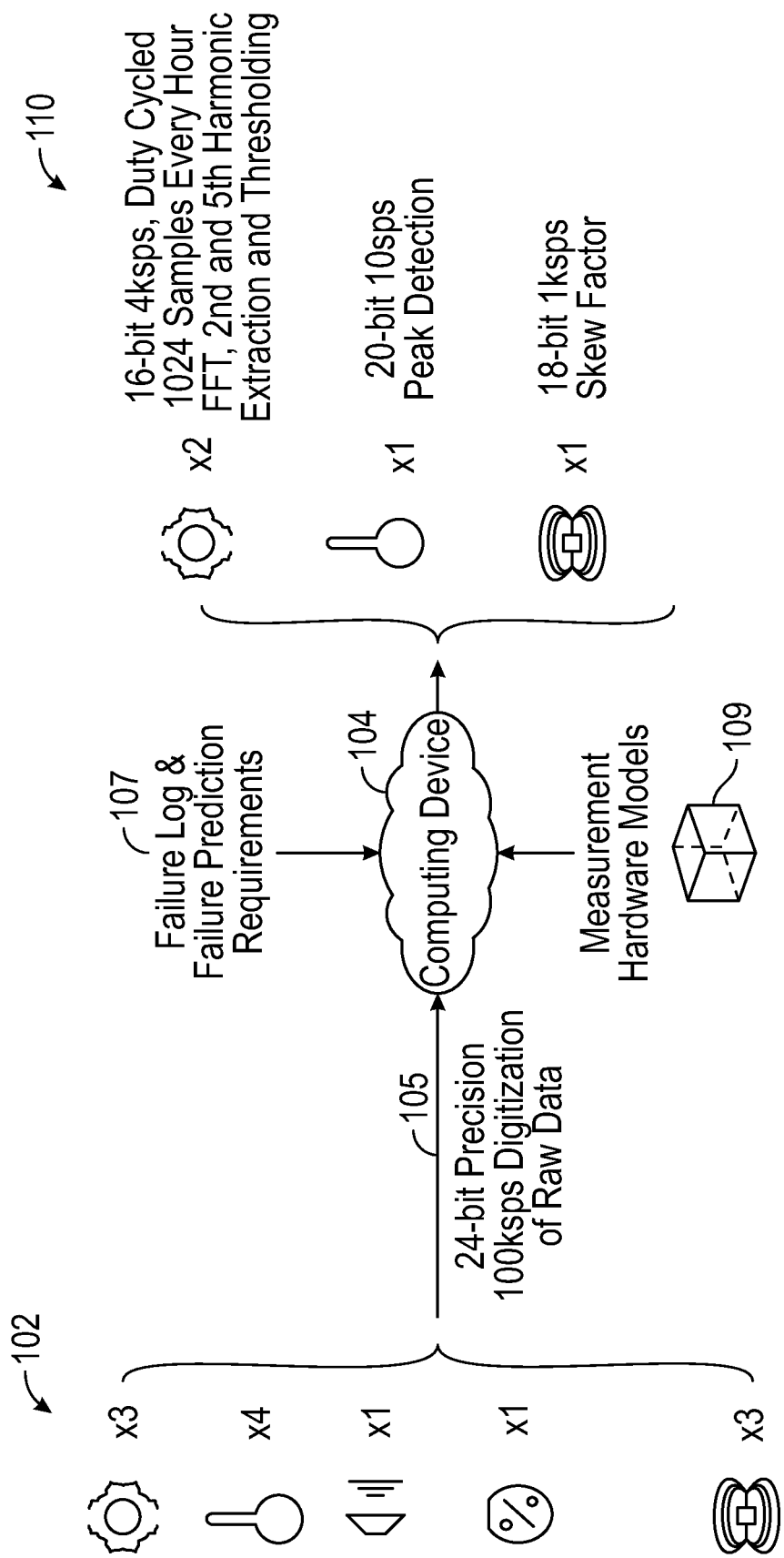
FIG. 2 is a diagram showing a non-limiting example of an asset specific hardware sensing solution for monitoring a physical asset, in accordance with this disclosure.

FIG. 2 is a diagram showing a non-limiting example of an asset specific hardware sensing solution for monitoring a physical asset, in accordance with this disclosure. The one or more different sensor types 102 in the example shown in FIG. 2 include three vibrations sensors, four temperature sensors, one acoustic sensor, one humidity sensors, and three magnetic field sensors. Each of the sensors provides 24-bit precision and the one or more different sensor types 102 provide 100 ksps digitization of raw data to the computing device 104.

In response to receiving 1) the data 105, 2) the failure log and failure prediction requirements 107, and 3) the information that represents the corresponding hardware models of the plurality of different sensor types from the sensor or hardware model 109, the computing device 104 can generate and display an output that represents a hardware configuration 110 for monitoring the physical asset. The hardware configuration 110 is an asset specific hardware sensing solution for monitoring a physical asset, such as the physical asset 112 of FIG. 1. The non-limiting example of a hardware configuration 110 depicts an asset specific sensing solution including two vibrations sensors, one temperature sensor, no acoustic sensors, no humidity sensors, and one magnetic field sensors.

Further, the computing device 104 determined that the sensors in the hardware configuration 110 need not be as precise as those in the one or more different sensor types 102. The two vibration sensors can be 16-bit 4 ksps, duty cycled 1024 samples every hour, and use FFT second and fifth harmonic extraction and thresholding. The one temperature sensor can be 10-bit 10 sps and use peak detection. The one magnetic field sensor 18-bit 1 ksps and use skew factor.

The hardware configuration 110 can include an embedded machine learning model, e.g., the machine learning model 114 of FIG. 1, such as based on 115 layers of CNC (computer numerically controlled) programming.

Figure 3:
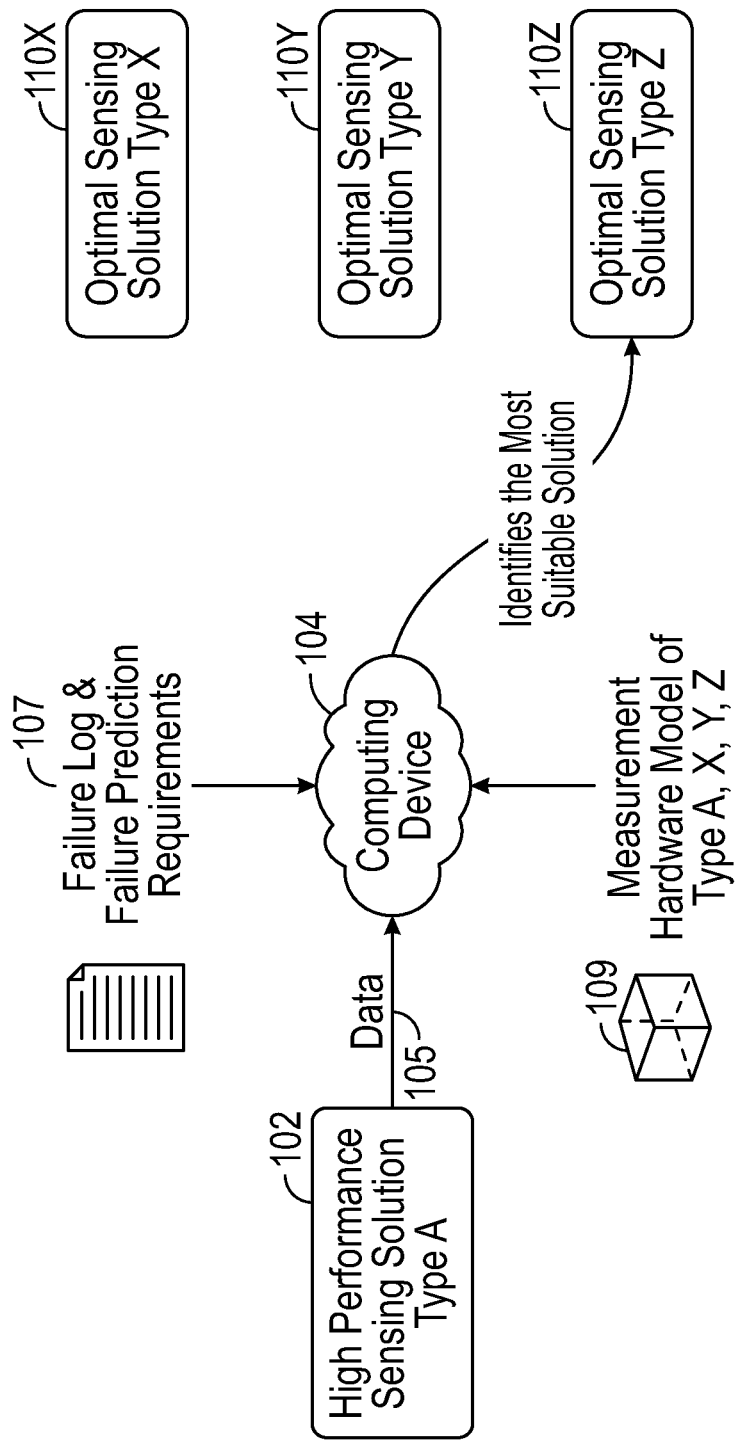
FIG. 3 is a diagram showing another example of an asset specific hardware sensing solution for monitoring a physical asset, in accordance with this disclosure.

FIG. 3 is a diagram showing another example of an asset specific hardware sensing solution for monitoring a physical asset, in accordance with this disclosure. The computing device 104 can receive 1) the data 105, 2) the failure log and failure prediction requirements 107, and 3) the information that represents the corresponding hardware models of the plurality of different sensor types from the sensor or hardware model 109.

The sensor or hardware model 109 includes a hardware model of the sensing solution type A, which were the sensors and the data acquisition hardware used to generate the raw data, as well as the hardware models of a set of predefined hardware configurations, including type X 110X (a first optimized solution), type Y 110Y (a second optimized solution), and type Z 110Z (a third optimized solution). Although three predefined hardware configurations 110X, 110Y, and 110Z are depicted in FIG. 3, some examples include more than three solutions of predefined hardware configurations and other examples include fewer than three solutions. In response, the computing device 104 can select a hardware configuration from the set of pre-defined hardware configurations, such as to recommend to a user, e.g., the customer 106 of FIG. 1. For example, in FIG. 3, the computing device 104 selected predefined hardware configuration 110Z as the most suitable solution.

In some examples, a first sensor type of the one or more different sensor types 102 has a first precision, and at least one of the plurality of different sensor types of the hardware configuration 110 is of the first sensor type and has a second precision different than the first precision. For example, the one or more different sensor types 102 can include a 24-bit temperature sensor, which can be optimized in the hardware configuration 110 as a 16-bit temperature sensor.

In other examples, a first sensor type of the one or more different sensor types 102 has a first sampling rate, and at least one of the plurality of different sensor types of the hardware configuration 110 is of the first sensor type and has a second sampling rate different than the first sampling rate. For example, the one or more different sensor types 102 can include a 100 ksps simultaneous sampling temperature sensor, which can be optimized in the hardware configuration 110 as a 10 ksps duty cycle sampled temperature sensor. Other examples of sampling including sequential sampling of multiple sensors, continuous sampling, and simultaneous sampling of multiple sensors.

In some examples, the one or more different sensor types 102 includes multiple ones of a first sensor type, and the hardware configuration 110 includes one or more fewer of the first sensor type. For example, the one or more different sensor types 102 can include three temperature sensors and the optimized hardware configuration 110 includes two temperature sensors.

In other examples, the one or more different sensor types 102 includes multiple ones of a first sensor type having a first precision, a first sampling rate, and multiple ones of the first sensor type. The set of pre-defined hardware configurations from which the hardware configuration 110 can be selected includes: 1) a first pre-defined hardware configuration including at least one sensor of the first sensor type having a second precision less than the first precision; 2) a second pre-defined hardware configuration including at least one sensor of the first sensor type and having a second sampling rate less than the first sampling rate; and 3) a third pre-defined hardware configuration including one or more fewer of the first sensor type.

Figure 4:
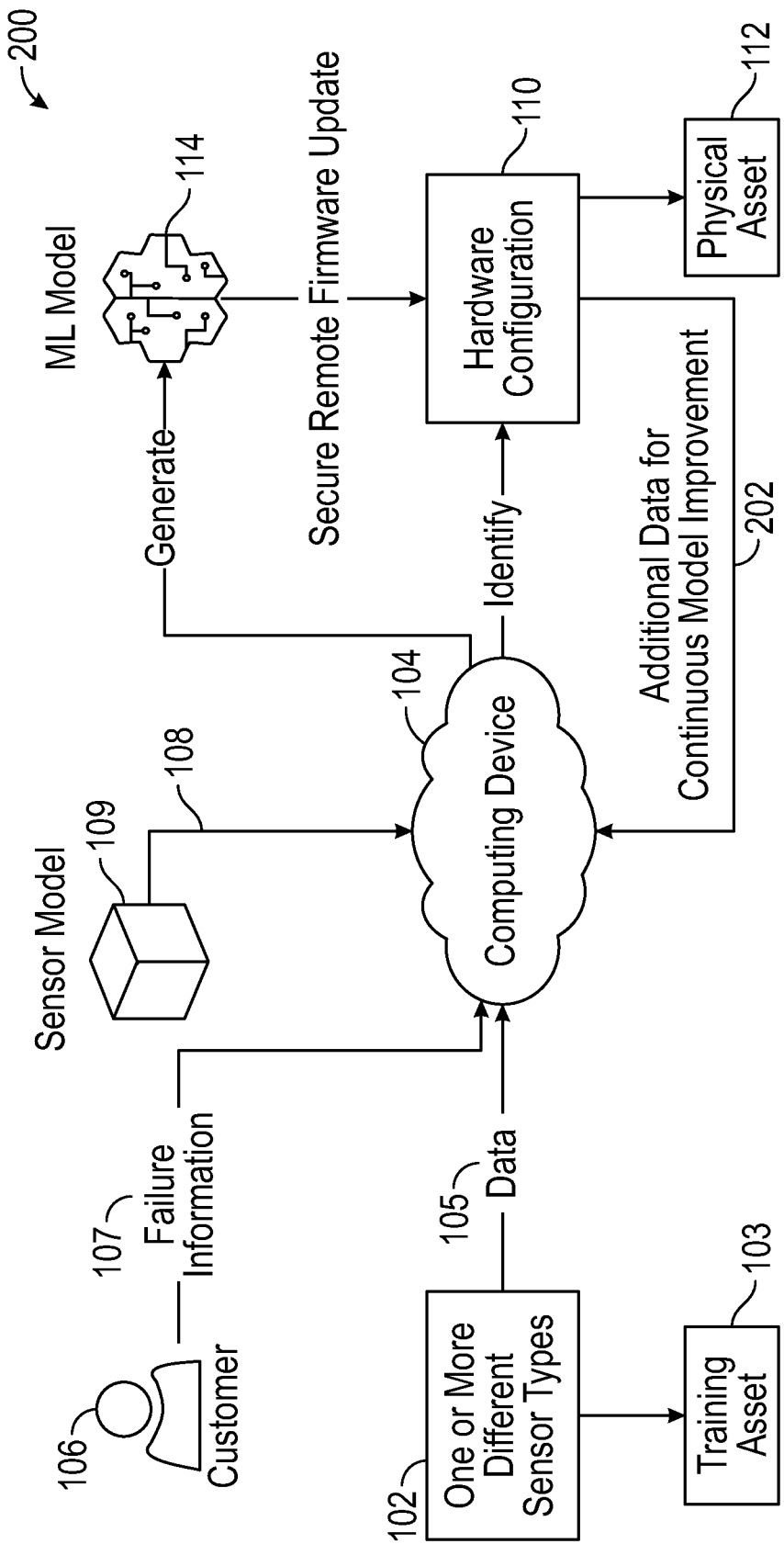
FIG. 4 is a diagram showing another example of a system for determining a condition-based maintenance hardware solution for monitoring a physical asset, in accordance with this disclosure.

FIG. 4 is a diagram showing another example of a system for determining a condition-based maintenance hardware solution for monitoring a physical asset, in accordance with this disclosure. Some of the components of the system 200 in FIG. 4 are similar to components of the system 100 in FIG. 1. As such, similar reference numbers are used and, for conciseness, similar elements will not be described in detail again.

Even after a deployment of a hardware configuration 110, which is an end solution with an embedded machine learning model 114, it can be desirable to improve the trained machine learning model 114 (and possibly the hardware configuration 110), such as continuously. As seen in FIG. 4, the hardware configuration 110 can generate data 202 that the computing device 104 can use to update the trained machine learning model 114, such as to improve the ability of the hardware configuration 110 to predict failures even after the hardware configuration 110 has been deployed to automatically monitor the physical asset 112. Any updates or improvement to the machine learning model 114 can help improve fault detection accuracy and cover additional fault types upon discovery, such as if the environment of the physical asset 112 changes. In some examples, the trained machine learning model 114 can be updated using supervised learning.

There are several techniques to make continuous improvements to the machine learning model 114. In one example, the customer 106 of FIG. 1 can continue to use the high performance one or more different sensor types 102 with the training asset 103 to generate and collect additional training data 105 to refine the machine learning model 114 so as to provide continuous learning. In another example, the system 100 is configured to stream sensing data to refine the machine learning model 114. In another example, the system 100 can store data related to an event locally and feed it back to the computing device 104 to improve the machine learning model 114. In yet another example, the system 100 can perform federated learning to help improve the common machine learning model 114.

Figure 5:
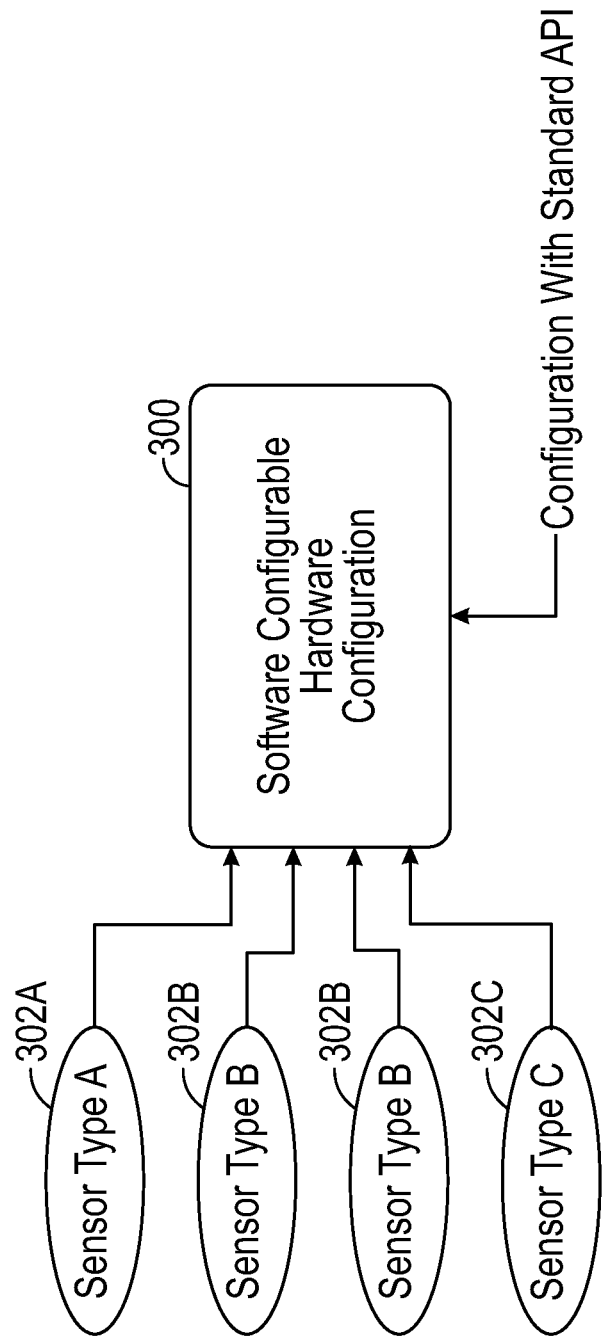
FIG. 5 depicts an example of a scalable hardware solution that can be software configured into multiple solutions, in accordance with various techniques of this disclosure.

FIG. 5 depicts an example of a scalable hardware solution that can be software configured into multiple solutions, in accordance with various techniques of this disclosure. The software configurable hardware configuration 300 can scale to support different sensor types and channel counts and can be configured using a standard application programming interface (API). The techniques of FIG. 5 allow a system to configure, using software, a hardware configuration into multiple solution types.

The software configurable hardware configuration 300 receives as input data from various sensor types. For example, in FIG. 5, the software configurable hardware configuration 300 receives data from one first sensor type 302A (type A), two second sensor types 302B (type B), and one third sensor type 302C (type C). The sensor types 302A-302C can be part of a modularized sensor interface to allow a user, e.g., the customer 106 of FIG. 1, to determine the appropriate sensor combination for individual use cases.

The software configurable hardware configuration 300 of FIG. 5 allows a customer, for example, to swap around front-end sensor types and adjust the measurement performance to meet different measurement requirements. In addition, the software configurable hardware configuration 300 allows a customer to scale connectivity and scale security.

Figure 6:
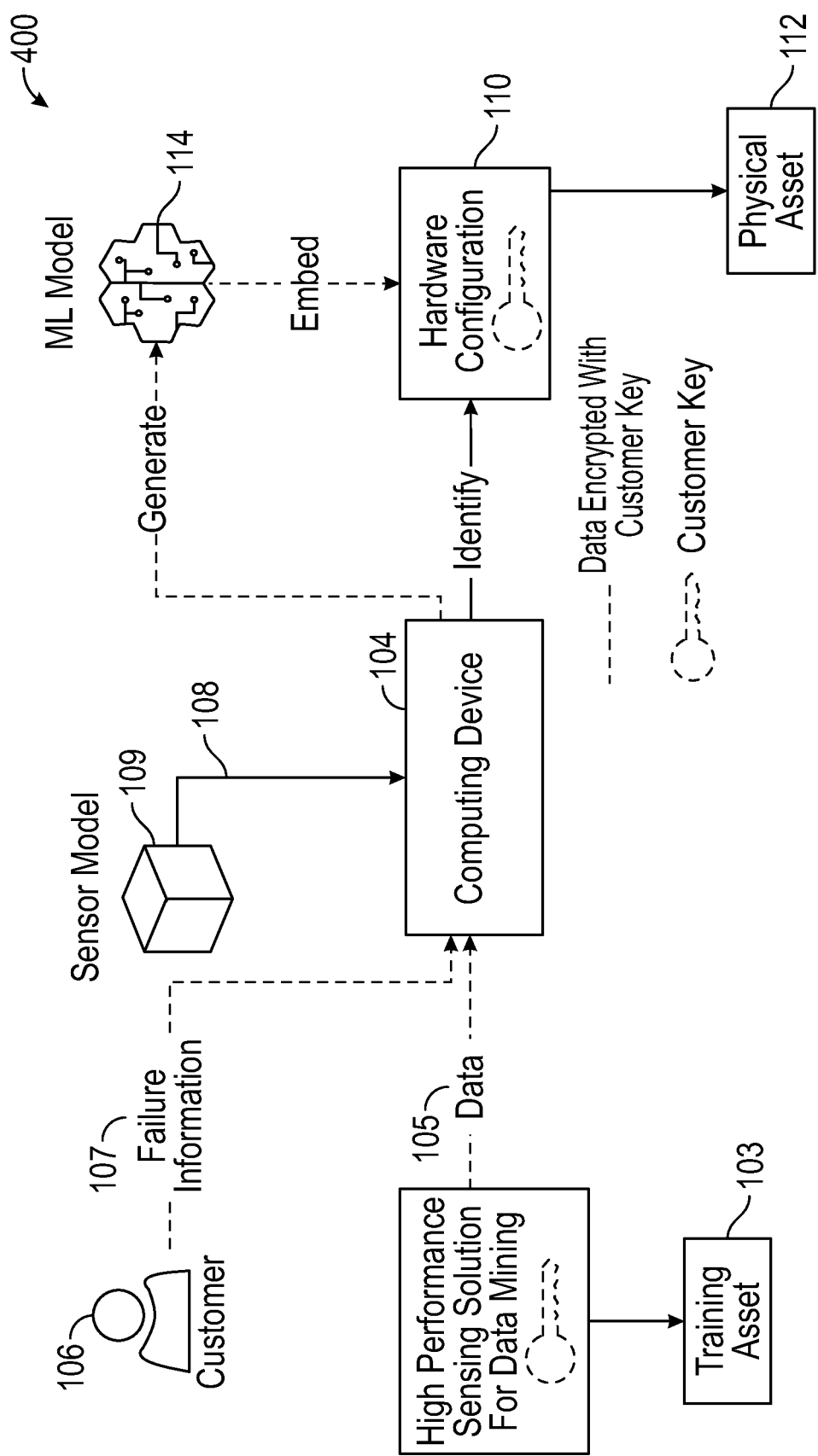
FIG. 6 is a diagram showing another example of a system for determining a condition-based maintenance hardware solution for monitoring a physical asset, in accordance with this disclosure.

FIG. 6 is a diagram showing another example of a system for determining a condition-based maintenance hardware solution for monitoring a physical asset, in accordance with this disclosure. Some of the components of the system 400 in FIG. 6 are similar to components of the system 100 in FIG. 1. As such, similar reference numbers are used and, for conciseness, similar elements will not be described in detail again.

Some customers 106 may find it desirable to keep their data and algorithms confidential, instead of sharing them with CBM service providers. The techniques of FIG. 6 allow the computing device 104 to still perform data analytics and training of the machine learning model 114 without exposing the customer data. In some examples, the computing device 104 is owned and/or operated by the CBM service provider.

In FIG. 6, the customer 106 can use a secret customer key to encrypt the data 105 and/or the training asset failure information 107 before sending that information to the computing device 104. The computing device 104 can decrypt the data 105 and the training asset failure information 107 and process normally, like in FIG. 1 where there was no encryption. Only the customer 106 has access to the encrypted information.

The computing device 104 can then identify an optimal hardware configuration 110 and generate an encrypted machine learning model 114 using the customer key. The optimal hardware configuration 110 can then be provisioned with the customer information, such as to only work with the customer's encrypted machine learning model 114.

Figure 7:
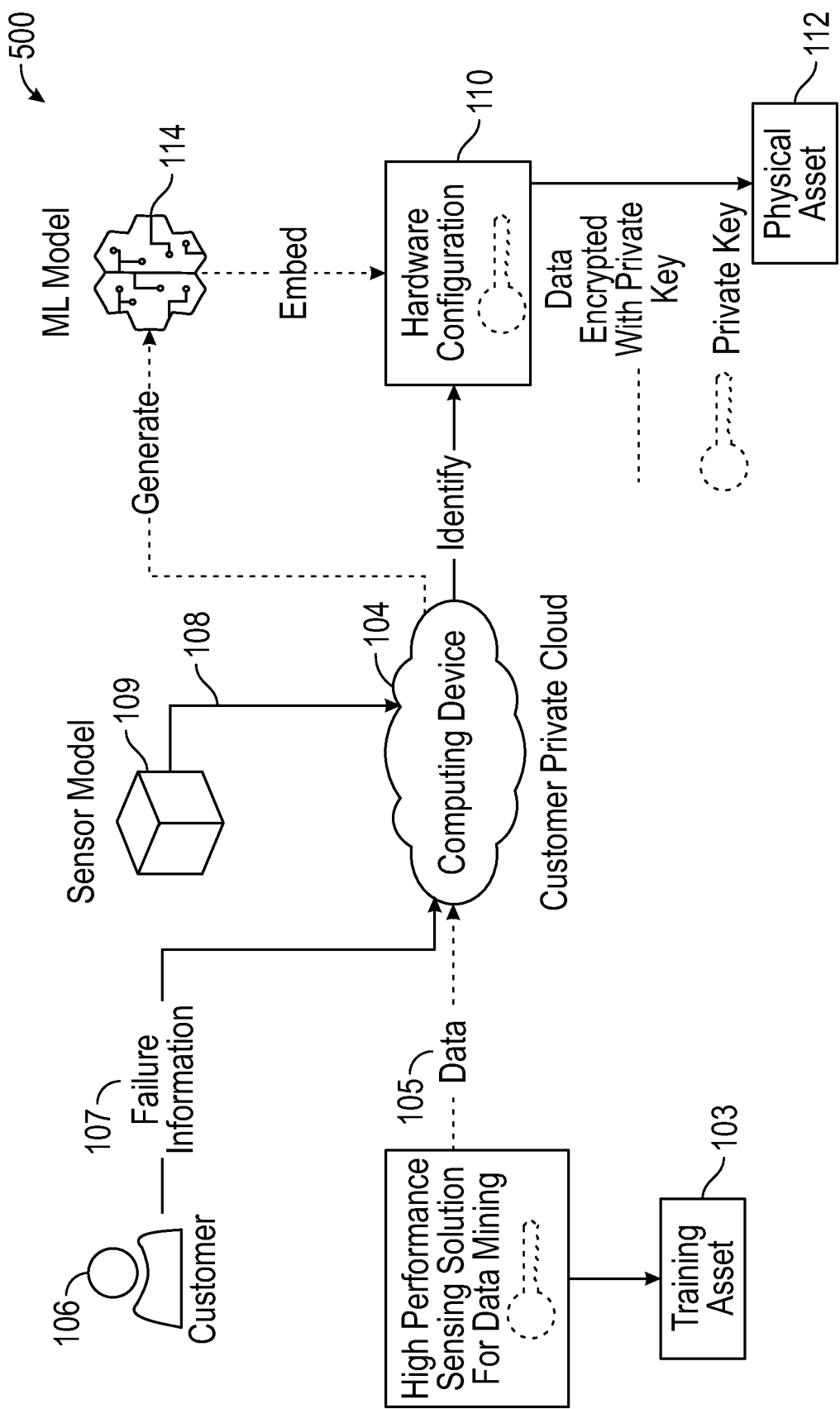
FIG. 7 is a diagram showing another example of a system for determining a condition-based maintenance hardware solution for monitoring a physical asset, in accordance with this disclosure.

FIG. 7 is a diagram showing another example of a system for determining a condition-based maintenance hardware solution for monitoring a physical asset, in accordance with this disclosure. Some of the components of the system 500 in FIG. 7 are similar to components of the system 100 in FIG. 1. As such, similar reference numbers are used and, for conciseness, similar elements will not be described in detail again.

In some examples, the customer 106 can host the computing device 104, such as on the customer's private network or cloud. The techniques of this disclosure that are implemented by the computing device 104 to generate the machine learning model 114 and the hardware configuration 110 can be encrypted by a private key and, in some cases, licensed to the customer 106. In addition, the data 105 can be encrypted using a private key to which the customer does not have access. The computing device 104 can then identify an optimal hardware configuration 110 and generate an encrypted machine learning model 114 using the private key. In such an example, the customer 106 can use the hardware solution from the same CBM solution provider that provides the tool for learning and algorithm development.

Figure 8:
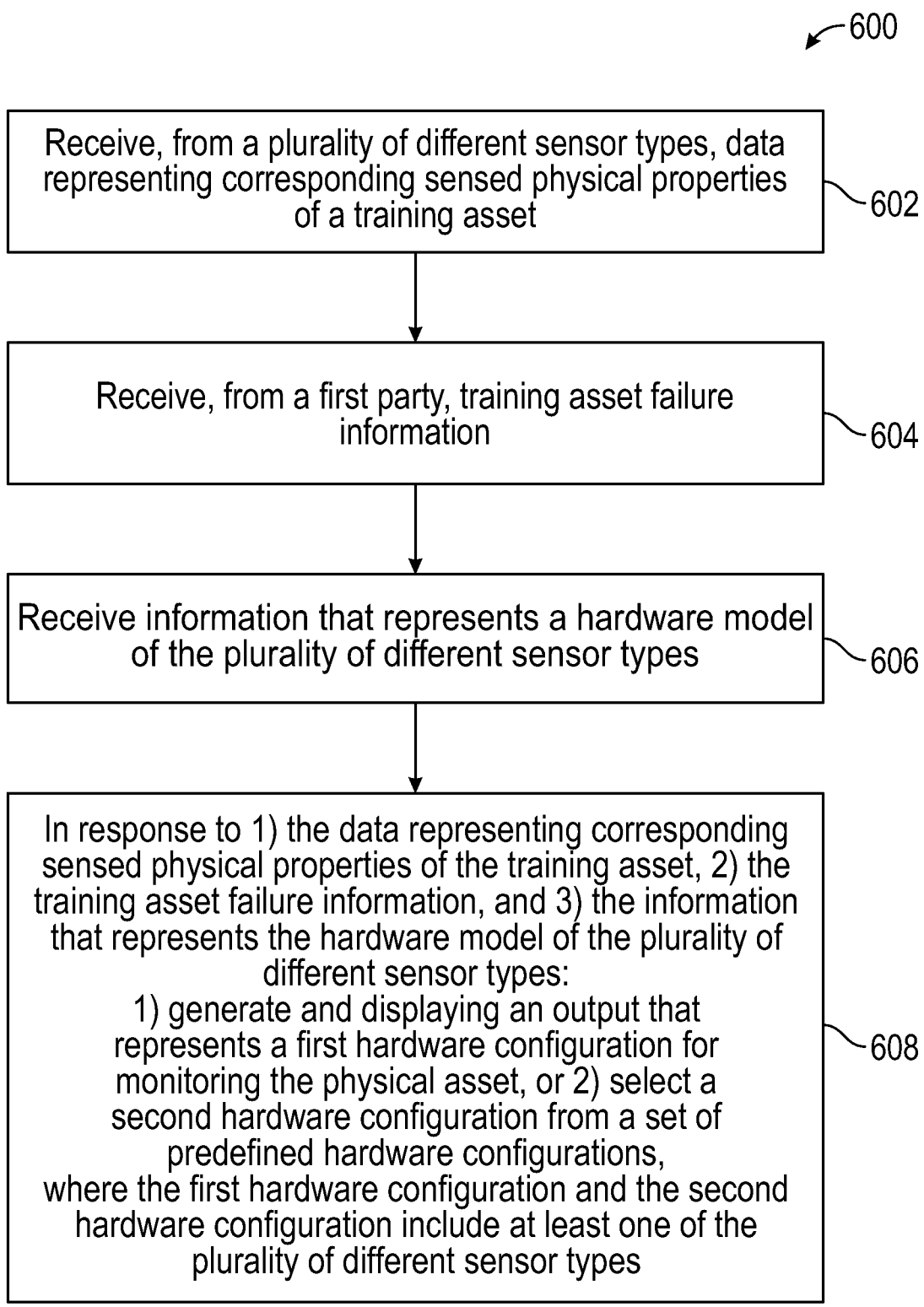
FIG. 8 is a flow diagram of an example of a computer-implemented method of determining a condition-based maintenance hardware solution for monitoring a physical asset, in accordance with this disclosure.

FIG. 8 is a flow diagram of an example of a computer-implemented method of determining a condition-based maintenance hardware solution for monitoring a physical asset, in accordance with this disclosure. The method 600 can be implemented by the machine shown in FIG. 9.

At block 602, the method 600 includes receiving, from a plurality of different sensor types, data representing corresponding sensed physical properties of a training asset. At block 604, the method 600 includes receiving, from a first party, training asset failure information. At block 606, the method 600 includes receiving information that represents a hardware model of the plurality of different sensor types At block 608, the method 600 includes, in response to 1) the data representing corresponding sensed physical properties of the training asset, 2) the training asset failure information, and 3) the information that represents the hardware model of the plurality of different sensor types, 1) generating and displaying an output that represents a first hardware configuration for monitoring the physical asset, or 2) selecting a second hardware configuration from a set of pre-defined hardware configurations, where the first hardware configuration and the second hardware configuration include at least one of the plurality of different sensor types.

In some examples, in addition to selecting from 1) generating and displaying an output that represents a first hardware configuration for monitoring the physical asset, or 2) selecting a second hardware configuration from a set of pre-defined hardware configurations, the method 600 can additionally or alternatively select from 3) configuring, using software, a third hardware configuration.

In some examples, the method 600 includes, in response to 1) the data representing corresponding sensed physical properties of the training asset, 2) the training asset failure information, and 3) the information that represents the hardware model of the plurality of different sensor types, training a machine learning model to be used by the first hardware configuration or the second hardware configuration to automatically predict a failure of a component of the physical asset.

In some examples, the method 600 includes receiving, from either the first hardware configuration or the second hardware configuration, 4) data representing corresponding sensed physical properties of the physical asset; and in further response to 3) the data representing corresponding sensed physical properties of the physical asset: updating the trained machine learning model.

In some examples, the method 600 includes using a trained machine learning model with the first hardware configuration or the second hardware configuration to automatically predict a failure of a component of the physical asset.

In some examples, a first sensor type of the plurality of different sensor types has a first precision, and the at least one of the plurality of different sensor types of the first hardware configuration is of the first sensor type and has a second precision less than the first precision.

In some examples, a first sensor type of the plurality of different sensor types has a first sampling rate, and the at least one of the plurality of different sensor types of the first hardware configuration is of the first sensor type and has a second sampling rate different than the first sampling rate.

In some examples, the plurality of different sensor types includes multiple ones of a first sensor type, and the at least one of the plurality of different sensor types of the first hardware configuration includes one or more fewer of the first sensor type.

In some examples, the plurality of different sensor types includes multiple ones of a first sensor type, the first sensor type of the plurality of different sensor types has a first precision, the first sensor type of the plurality of different sensor types has a first sampling rate, wherein the plurality of different sensor types includes multiple ones of a first sensor type, and the set of pre-defined hardware configurations includes: a first pre-defined hardware configuration including at least one sensor of the first sensor type having a second precision less than the first precision; a second pre-defined hardware configuration including at least one sensor of the first sensor type and having a second sampling rate less than the first sampling rate; and a third pre-defined hardware configuration including one or more fewer of the first sensor type.

In some examples, the method 600 includes encrypting, by the first party, the training asset failure information.

In some examples, the method 600 includes encrypting the data representing corresponding sensed physical properties of the training asset.

Figure 9:
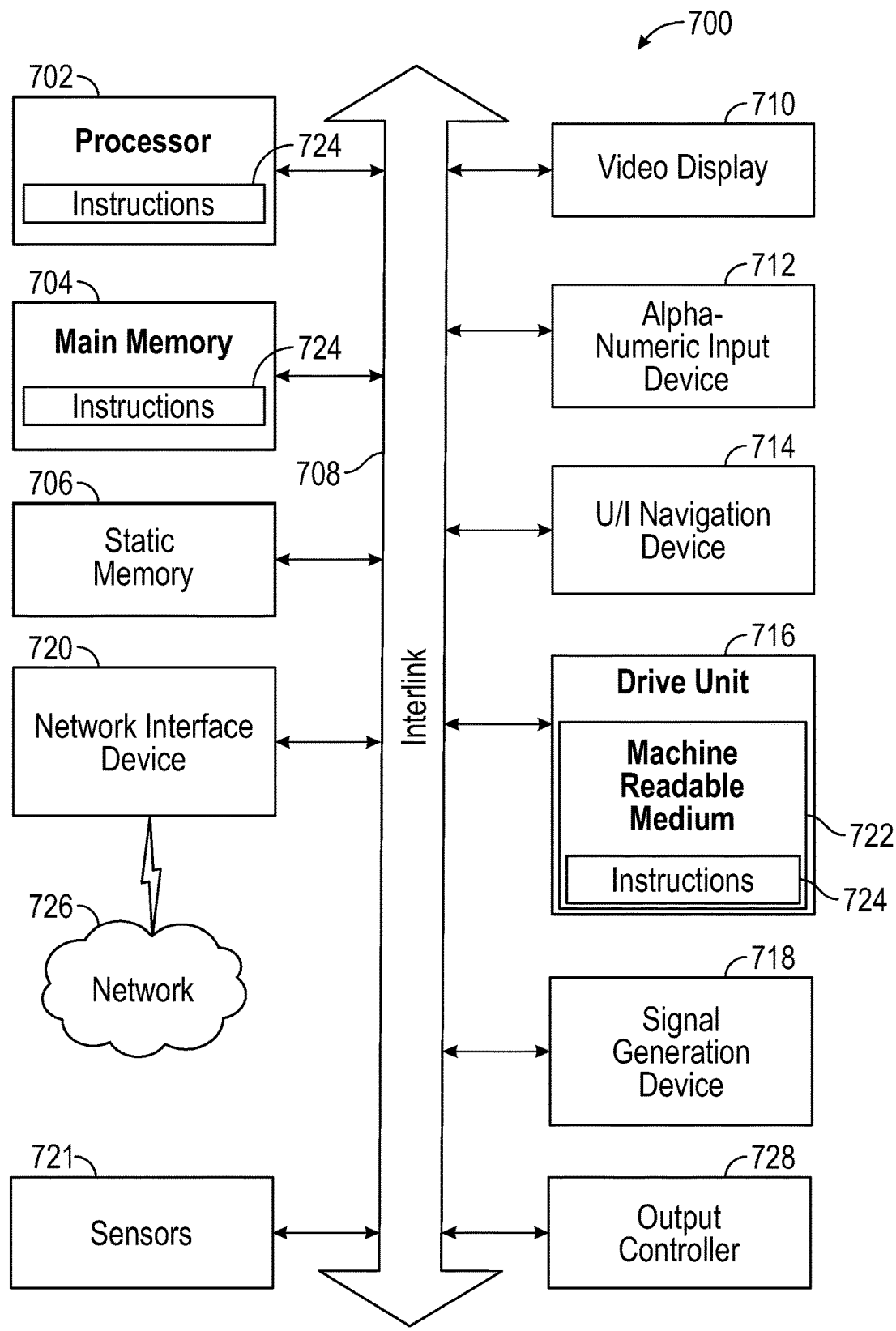
FIG. 9 illustrates a block diagram of an example comprising a machine 700 upon which any one or more of the techniques (e.g., methodologies) discussed herein may be performed.

FIG. 9 illustrates a block diagram of an example comprising a machine 700 upon which any one or more of the techniques (e.g., methodologies) discussed herein may be performed. In various examples, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 800 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 808. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 708 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others). In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

VARIOUS NOTES

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A computer-implemented method of determining a condition-based maintenance hardware solution for monitoring a physical asset, the computer-implemented method comprising:

receiving, from a plurality of different sensor types, data representing corresponding sensed physical properties of a training asset;

receiving, from a first party, training asset failure information;

receiving information that represents a hardware model of at least the plurality of different sensor types; and in response to 1) the data representing corresponding sensed physical properties of the training asset, 2) the training asset failure information, and 3) the information that represents the hardware model of at least the plurality of different sensor types:

1) Generating and displaying an output that represents a first hardware configuration for monitoring the physical asset, or 2) selecting a second hardware configuration from a set of pre-defined hardware configurations, wherein the first hardware configuration and the second hardware configuration include at least one of the plurality of different sensor types.

2. The computer-implemented method of claim 1, comprising:

generating and displaying the output that represents the first hardware configuration for monitoring the physical asset.

3. The computer-implemented method of claim 1, comprising:

selecting the second hardware configuration from a set of pre-defined hardware configurations.

4. The computer-implemented method of claim 1, comprising:

in response to 1) the data representing corresponding sensed physical properties of the training asset, 2) the training asset failure information, and 3) the information that represents the hardware model of at least the plurality of different sensor types:

training a machine learning model to be used by the first hardware configuration or the second hardware configuration to automatically predict a failure of a component of the physical asset.

5. The computer-implemented method of claim 4, comprising:

receiving, from either the first hardware configuration or the second hardware configuration, 4) data representing corresponding sensed physical properties of the physical asset; and in further response to 3) the data representing corresponding sensed physical properties of the physical asset:

updating the trained machine learning model.

6. The computer-implemented method of claim 1, comprising:

using a trained machine learning model with the first hardware configuration or the second hardware configuration to automatically predict a failure of a component of the physical asset.

7. The computer-implemented method of claim 1, wherein a first sensor type of the plurality of different sensor types has a first precision, and wherein the at least one of the plurality of different sensor types of the first hardware configuration is of the first sensor type and has a second precision less than the first precision.

8. The computer-implemented method of claim 1, wherein a first sensor type of the plurality of different sensor types has a first sampling rate, and wherein the at least one of the plurality of different sensor types of the first hardware configuration is of the first sensor type and has a second sampling rate different than the first sampling rate.

9. The computer-implemented method of claim 1, wherein the plurality of different sensor types includes multiple ones of a first sensor type, and wherein the at least one of the plurality of different sensor types of the first hardware configuration includes one or more fewer of the first sensor type.

10. The computer-implemented method of claim 1, wherein the plurality of different sensor types includes multiple ones of a first sensor type, wherein the first sensor type of the plurality of different sensor types has a first precision, wherein the first sensor type of the plurality of different sensor types has a first sampling rate, wherein the plurality of different sensor types includes multiple ones of a first sensor type, and wherein the set of pre-defined hardware configurations includes:

a first pre-defined hardware configuration including at least one sensor of the first sensor type having a second precision less than the first precision;

a second pre-defined hardware configuration including at least one sensor of the first sensor type and having a second sampling rate less than the first sampling rate; and a third pre-defined hardware configuration including one or more fewer of the first sensor type.

11. The computer-implemented method of claim 1, comprising:

encrypting, by the first party, the training asset failure information.

12. The computer-implemented method of claim 1, comprising:

encrypting the data representing corresponding sensed physical properties of the training asset.

13. A system for determining a condition-based maintenance hardware solution for monitoring a physical asset, the computer-implemented method comprising:

a computing device having a processor configured to:

receive, from a plurality of different sensor types, data representing corresponding sensed physical properties of a training asset;

receive, from a first party, training asset failure information;

receive information that represents a hardware model of at least the plurality of different sensor types;

in response to 1) the data representing corresponding sensed physical properties of the training asset, 2) the training asset failure information, and 3) the information that represents the hardware model of at least the plurality of different sensor types:

1) Generate and display an output that represents a first hardware configuration for monitoring the physical asset, 2) select a second hardware configuration from a set of pre-defined hardware configurations, or 3) configure, using software, a third hardware configuration;

wherein the first hardware configuration and the second hardware configuration include at least one of the plurality of different sensor types; and use a trained machine learning model with the first hardware configuration or the second hardware configuration to automatically predict a failure of a component of the physical asset.

14. The system of claim 13, wherein the processor is configured to:

generate and display the output that represents the first hardware configuration for monitoring the physical asset.

15. The system of claim 13, wherein the processor is configured to:

select the second hardware configuration from a set of pre-defined hardware configurations.

16. The system of claim 13, wherein the processor is configured to:

configure, using software, a third hardware configuration.

17. The system of claim 13, wherein in response to 1) the data representing corresponding sensed physical properties of the training asset, 2) the training asset failure information, and 3)

the information that represents the hardware model of the plurality of different sensor types, the processor is configured to:
train a machine learning model to be used by the first hardware configuration or the second hardware configuration to automatically predict a failure of a component of the physical asset.

18. The system of claim 13, wherein the processor is configured to:
receive, from either the first hardware configuration or the second hardware configuration, 4) data representing corresponding sensed physical properties of the physical asset; and
in further response to 3) the data representing corresponding sensed physical properties of the physical asset:
update the trained machine learning model.

19. A computer-implemented method of determining a condition-based maintenance hardware solution for monitoring a physical asset, the computer-implemented method comprising:
receiving, from a plurality of different sensor types, data representing corresponding sensed physical properties of a training asset;
receiving, from a first party, training asset failure information;
receiving information that represents a hardware model of at least the plurality of different sensor types;
in response to 1) the data representing corresponding sensed physical properties of the training asset, 2) the training asset failure information, and 3) the information that represents the hardware model of at least the plurality of different sensor types:
1) Selecting a first hardware configuration from a set of pre-defined hardware configurations, or 2) configure, using software, a second hardware configuration;
wherein the first hardware configuration includes at least one of the plurality of different sensor types; and
using a trained machine learning model with the first hardware configuration or the second hardware configuration to automatically predict a failure of a component of the physical asset.

20. The computer-implemented method of claim 19, comprising:
receiving, from either the first hardware configuration or the second hardware configuration, 4) data representing corresponding sensed physical properties of the physical asset; and
in further response to 3) the data representing corresponding sensed physical properties of the physical asset:
updating the trained machine learning model.

* * * * *